United States Patent
Matsuura et al.

(10) Patent No.: US 6,850,966 B2
(45) Date of Patent: Feb. 1, 2005

(54) METHOD FOR SMOOTH SCHEDULING ON A PERIODIC BASIS IN A CLIENT-SERVER SYSTEM

(75) Inventors: Shun Matsuura, Tokyo (JP); Hiroaki Nakamitsu, Fujisawa (JP); Hayashi Ito, Matsudo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/226,737

(22) Filed: Aug. 23, 2002

(65) Prior Publication Data

US 2003/0046326 A1 Mar. 6, 2003

(30) Foreign Application Priority Data

Aug. 28, 2001 (JP) ........................................ 2001-258637

(51) Int. Cl.[7] .............................................. G06F 15/16
(52) U.S. Cl. ........................ 709/203; 718/102; 718/105
(58) Field of Search ................................ 718/100–102, 718/105; 700/89, 100, 23; 709/203, 102, 105

(56) References Cited

U.S. PATENT DOCUMENTS

| | | | | |
|---|---|---|---|---|
| 5,631,908 A | * | 5/1997 | Saxe | 370/235 |
| 5,729,539 A | * | 3/1998 | Heeschen et al. | 370/332 |
| 5,828,878 A | * | 10/1998 | Bennett | 709/102 |
| 5,845,279 A | * | 12/1998 | Garofalakis et al. | 707/7 |
| 6,041,315 A | * | 3/2000 | Pollin | 705/45 |
| 6,233,588 B1 | * | 5/2001 | Marchoili et al. | 707/200 |
| 6,320,865 B1 | * | 11/2001 | Agrawala et al. | 370/413 |
| 6,401,121 B1 | * | 6/2002 | Yoshida et al. | 709/227 |
| 6,559,882 B1 | * | 5/2003 | Kerchner | 348/61 |
| 6,571,215 B1 | * | 5/2003 | Mahapatro | 705/8 |
| 6,615,179 B1 | * | 9/2003 | McNicol et al. | 705/1 |

OTHER PUBLICATIONS

M. H. Ammar and J.W. Wong, "On the optimality of cyclic transmission in Teletext systems," IEEE Trans. on Comm., COM–35(1), 68–73, 1987.*

A. Bar–Noy, R. Bhatia, J. Naor, and B. Schieber, "Minimizing Service and Operation Costs of Peridoic Scheduling," Proc. of the $9^{th}$ ACM–SIAM Symp. on Disc. Alg. (SODA–98), 11–20, 1998.*

* cited by examiner

Primary Examiner—Nabil Elhady
Assistant Examiner—Aaron Perez-Daple
(74) Attorney, Agent, or Firm—Pitney Hardin LLP

(57) ABSTRACT

In a server that communicates with a large number of pieces of information equipment, a communication schedule between the server and the information equipment is created in an appropriate and efficient manner. Provided is an apparatus in a client-server system, having a scheduler embodied on a computer readable medium for creating a schedule, which comprises: a means for calculating a table of maximum values respectively for the number of processes for each time slot, which calculates the table of maximum respectively for the number of processes for each time slot, which is obtained by finding the respective maximum value of the number of processes performed in each time slot in a cycle of N days; and a means for calculating a time slot, which finds a time slot having the minimum value out of the maximum values obtained in the foregoing manner, in order to find a time slot in which the number of processes performed in the same time slot is brought to the minimum under the rule that the processes including communication are performed in the same time slot every N days.

7 Claims, 23 Drawing Sheets

FIG. 3

|              | Time slot 1 00:00–05:59 | Time slot 2 06:00–11:59 | Time slot 3 12:00–17:59 | Time slot 4 18:00–23:59 |
|--------------|---|---|---|---|
| First day    | 5 | 2 | 4 | 0 |
| Second day   | 4 | 0 | 3 | 6 |
| Third day    | 1 | 3 | 0 | 3 |

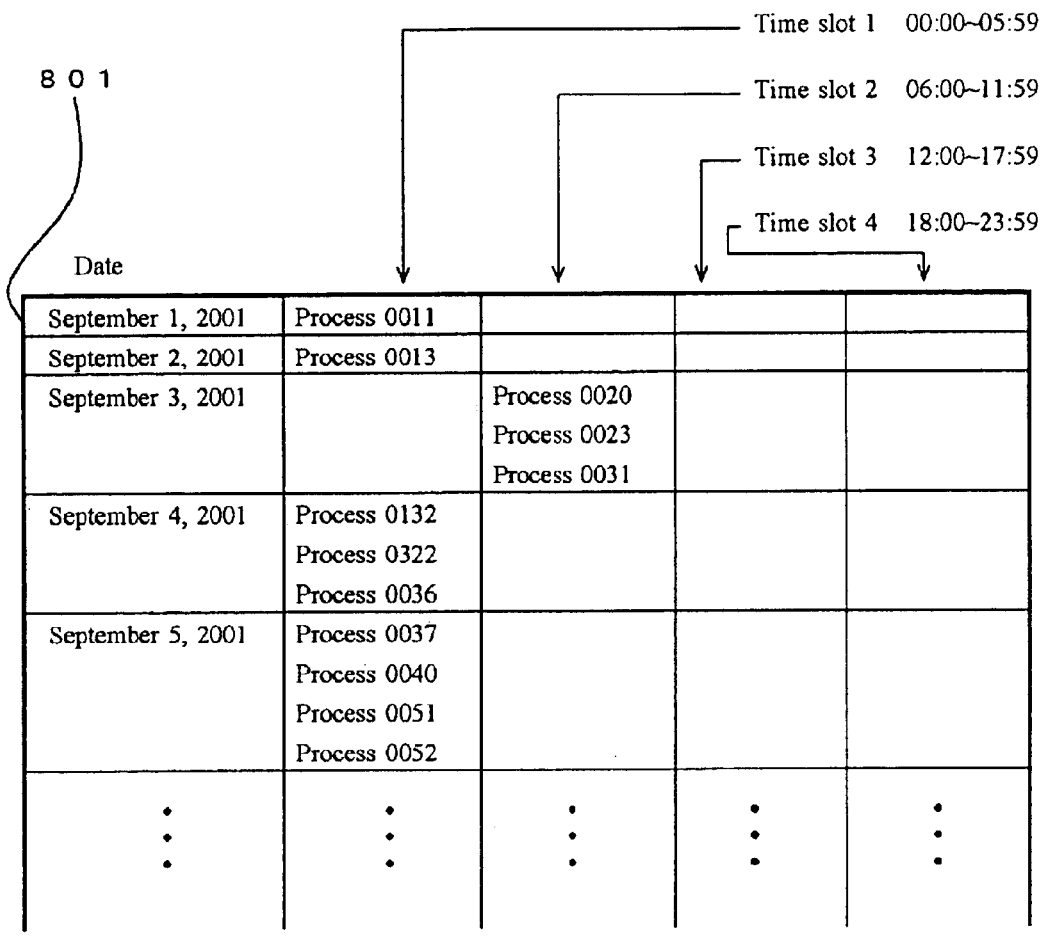

| Date | Time slot 1 00:00~05:59 | Time slot 2 06:00~11:59 | Time slot 3 12:00~17:59 | Time slot 4 18:00~23:59 |
|---|---|---|---|---|
| September 1, 2001 | Process 0011 | | | |
| September 2, 2001 | Process 0013 | | | |
| September 3, 2001 | | Process 0020<br>Process 0023<br>Process 0031 | | |
| September 4, 2001 | Process 0132<br>Process 0322<br>Process 0036 | | | |
| September 5, 2001 | Process 0037<br>Process 0040<br>Process 0051<br>Process 0052 | | | |
| ⋮ | ⋮ | ⋮ | ⋮ | ⋮ |

801

802

| Process identifier | Process contents |
|---|---|
| Process 0011 | Transmit control A76B to infomation equipment 038472 |
| Process 0013 | Transmit control Z80C to infomation equipment 147623 |
| Process 0015 | Transmit control T84V to infomation equipment 58971 |
| ⋮ | ⋮ |

| Date | Time slot | Process identifier |
|---|---|---|
| September 1, 2001 | 1 | Process 0011 |
| September 2, 2001 | 1 | Process 0013 |
| September 3, 2001 | 2 | Process 0020 |
| September 3, 2001 | 2 | Process 0023 |
| September 3, 2001 | 2 | Process 0031 |
| ⋮ | ⋮ | ⋮ |

FIG. 15

Time frame control table  1501

Time slot 1  00:00~05:59
Time slot 2  06:00~11:59
Time slot 3  12:00~17:59
Time slot 4  18:00~23:59

| | Time slot 1 | Time slot 2 | Time slot 3 | Time slot 4 |
|---|---|---|---|---|
| Sunday | o | o | o | o |
| Monday | o | o | o | o |
| Tuesday | o | o | o | o |
| Wednesday | o | o | o | o |
| Thursday | o | o | o | o |
| Friday | o | o | o | o |
| Saturday | o | o | o | o |

Table for controlling the maximum values of resources  1502

Time slot 1  00:00~05:59
Time slot 2  06:00~11:59
Time slot 3  12:00~17:59
Time slot 4  18:00~23:59

| | Time slot 1 | Time slot 2 | Time slot 3 | Time slot 4 |
|---|---|---|---|---|
| Sunday | 5 | 5 | 5 | 5 |
| Monday | 5 | 5 | 5 | 5 |
| Tuesday | 5 | 5 | 5 | 5 |
| Wednesday | 5 | 5 | 5 | 5 |
| Thursday | 5 | 5 | 5 | 5 |
| Friday | 5 | 5 | 5 | 5 |
| Saturday | 5 | 5 | 5 | 5 |

Fig.17

Content of a request at time of requesting a creation of a time table
= Cycle, Period of control day and time,
  Desired number of terminals for reservation Cycle = DIGIT Period of control day and time
= Reference day and time of control, Distribution length Reference day and time of control
= < Year Month Day Hour Minute Second, Example=YYYY/MM/DD hh:mm:ss >

Distribution length = DIGIT

Desired number of terminals for reservation = DIGIT

FIG. 18

| Value of "cycle" | Meaning of the value |
|---|---|
| 0 | Cyclic iteration control is performed each day. |
| 1 | Cyclic iteration control is performed each week. |
| 2 | Cyclic iteration control is performed each month. |

FIG. 20

Time frame control table for "each day/each month" 2001

| Date | Time slot 1 00:00~05:59 | Time slot 2 06:00~11:59 | Time slot 3 12:00~17:59 | Time slot 4 18:00~23:59 |
|---|---|---|---|---|
| 1 | o | o | o | o |
| 2 | o | o | o | o |
| 3 | o | o | o | o |
| 4 | o | o | o | o |
| 5 | o | o | o | o |
| 6 | o | o | o | o |
| 7 | o | o | o | o |
| 8 | o | o | o | o |
| 9 | o | o | o | o |
| 10 | o | o | o | o |

| Date | Time slot 1 | Time slot 2 | Time slot 3 | Time slot 4 |
|---|---|---|---|---|
| 11 | o | o | o | o |
| 12 | o | o | o | o |
| 13 | o | o | o | o |
| 14 | o | o | o | o |
| 15 | o | o | o | o |
| 16 | o | o | o | o |
| 17 | o | o | o | o |
| 18 | o | o | o | o |
| 19 | o | o | o | o |
| 20 | o | o | o | o |

| Date | Time slot 1 | Time slot 2 | Time slot 3 | Time slot 4 |
|---|---|---|---|---|
| 21 | o | o | o | o |
| 22 | o | o | o | o |
| 23 | o | o | o | o |
| 24 | o | o | o | o |
| 25 | o | o | o | o |
| 26 | o | o | o | o |
| 27 | o | o | o | o |
| 28 | o | o | o | o |
| 29 | o | o | o | o |
| 30 | o | o | o | o |

Time frame control table for "each week" 2002

| Date | Time slot 1 00:00~05:59 | Time slot 2 06:00~11:59 | Time slot 3 12:00~17:59 | Time slot 4 18:00~23:59 |
|---|---|---|---|---|
| Sun | o | o | o | o |
| Mon | o | o | o | o |
| Tue | o | o | o | o |
| Wed | o | o | o | o |
| Thu | o | o | o | o |
| Fri | o | o | o | o |
| Sat | o | o | o | o |

Table for controlling the maximum number of reservation for "each day/each month" 2003

- Time slot 1 00:00~05:59 : o
- Time slot 2 06:00~11:59 : o
- Time slot 3 12:00~17:59 : o
- Time slot 4 18:00~23:59 : o Table for controlling the maximum number of reservation for "each week" 2004

- Time slot 1 00:00~05:59 : o
- Time slot 2 06:00~11:59 : o
- Time slot 3 12:00~17:59 : o
- Time slot 4 18:00~23:59 : o

METHOD FOR SMOOTH SCHEDULING ON A PERIODIC BASIS IN A CLIENT-SERVER SYSTEM

BACKGROUND OF THE INVENTION

1. Field of the Invention

The present invention relates to a method, for smooth scheduling on a periodic basis in a client-server system, an apparatus, having a scheduler embodied on a computer readable medium, and a scheduler embodied on a computer readable medium for creating a schedule, which allocate execution time slots for operation. As an example of creating a schedule, a server may determine the time slots for transmitting control instructions to a plurality of client apparatuses and creates a schedule thereby. In this case, it is required that a schedule be created so that the load in each time slot to the server does not become excessive. Furthermore, the present invention relates to a method for smooth scheduling on a periodic basis in a client-server system, an apparatus, having a scheduler embodied on a computer readable medium, and a scheduler embodied on a computer readable medium, in which an information consumer electronics server performs remote control to a particular information consumer electronics terminal, and the remote control is performed in a timing, wherein distribution of server resources in the information consumer electronics server is considered, particularly under the environment where the information consumer electronics server is connected to a plurality of information consumer electronics terminals by broadcasting or other communication network.

2. Description of Prior Art

In the case of transmitting the control instruction to a plurality of client apparatuses, the server makes a call out to the client apparatuses or the client apparatuses make a call out to the server, to establish a communication path, and thus control instructions are transmitted from the server. Conventionally, due to the high price of the client apparatus which communicates with the server, and the number of client apparatuses with which one server communicates staving at a level of one hundred odd units at most, there has not been a particular need for making an arrangement for creating a communication schedule.

Further, even in the case of making such arrangement, the arrangement has been inadequate, and the control table as shown in FIG. 15 has conventionally been used in order to control the timing of remote control, taking in consideration of the distribution of server resources. In FIG. 15, Table 1501 is a time frame control table that controls the reservation status of resources in each time frame, and Table 1502 is a table for controlling maximum values of resources that controls the maximum values of the server resources.

In FIG. 15, time slots, in which 1 day is divided into four time slots (time slot 1=00:00 to 05:59, time slot 2=06:00 to 11:59, time slot 3=12:00 to 17:59, time slot 4=18:00 to 23:59), are used as an example. Further, the cycle by which the server resources is distributed is set to 1 week (7 days). Accordingly in the example of FIG. 15, the reservation status of resources is controlled on the time frame control table 1501 based on the total of 28 time frames in relation to each time slot, wherein each day of the week is divided into four time slots. Furthermore, the respective maximum value of the server resources is controlled on the table for controlling maximum values of resources 1502 based on the total of 28 time frames in relation to each time slot, wherein each day of the week is divided into four time slots, in the same manner. In a conventional method, when an additional reservation of resources is newly made for "a time slot of a day of the week," the method was limited to the task of confirming that the value of the corresponding time frame, in the time frame control table 1501 after reservation, does not exceed the value of the corresponding time frame of the table 1502 for controlling maximum values of resources. When the first value does not exceed the second value as above, the method then makes a determination that new addition of reservation of resources can be made, and the operation to add reservation is thereby carried out. Note that the algorithm to make the time frame control table 1501 having a uniform reservation status can be cited as an example of a conventional algorithm to determine "a time slot of a day of the week." This algorithm determines a time frame having the smallest number of reservation status in the time frame control table 1501 as a time frame, in which addition of reservation of new resources is made.

As described above, in the environment under which the server is connected with a plurality of client apparatuses in the prior art, consideration has only been made as to how the server resources should be distributed in 1 cycle at most, that is, 1 week (7 days) in the example of FIG. 15.

However, information consumer electronics products, which are information equipment having a function to communicate with the server via a telephone line, have been provided inexpensively in recent years, the number of client apparatuses having the function to communicate with the server has increased at a faster rate, and it is predicted that the number will reach several hundreds of thousand or even a level of a few million. In addition, because the information consumer electronics products are used for a long period of time, the server apparatus needs to issue control instructions repeatedly to regularly perform function setting or the like. Consequently, in the server apparatus that communicates with a large number of client apparatuses, there exists a problem that the server apparatus is overloaded and sufficient service cannot be provided unless a communication schedule between the server apparatus and the client apparatuses is appropriately created. Further, there also exists a problem that operation of creating a schedule must be efficiently performed.

Furthermore in the prior art, when the server resource are distributed for a plurality of cycles, the operation to add reservation can only be performed to the time frame control table and to the table for controlling maximum values of resources, which are independent of each other, and accordingly, there also exists a problem that the server resources have not been effectively utilized, taking in consideration the relation among a plurality of cycles.

The method, the apparatus and the computer-program for creating a schedule to solve these problems have not been known.

SUMMARY OF THE INVENTION

In the present invention, a method for smooth scheduling on a periodic basis in a client-server system is provided to find a time slot in which the number of processes performed in the same time slot is brought to the minimum under the rule that the processes including communication is are performed in the same time slot every time a specified period passes, which is a method for creating a schedule that comprises of the steps of: finding the maximum value of a number of the number of processes for each time slot in a cycle of the specified periods and calculating a table of maximum values respectively for the number of processes for each time slot; and finding a time slot having the minimum value among the maximum values found in such a manner. With this configuration, the time slot having the minimum number of processes can be founds and the load to the server apparatus can be minimized when the server apparatus communicates with the client apparatuses to transmit the control instruction every time the specified period passes, and thus the problems as above can be solved.

Secondly, in the present invention, provided is a method for smooth scheduling on a periodic basis in a client-server system, which creates a schedule that further includes the step of: associating a processing identifier that identifies the process to be performed with the time slot found and holding it. With this configuration, the processes are associated with the time slot having the minimum load to the server and then executed, and thus the load to the server is minimized, which solves the problems.

Thirdly, in the case of newly associating the processing identifier with the time slot the present invention provides a method for updating the table of maximum values respectively for the number of processes for each time slot when the number of the process identifiers associated with the time slot before they are newly associated, is equal to the maximum number of processes in the time slot. With this configuration, a task to find the table of maximum values respectively for the number of processes for each time slot is reduced, and the operation to create a schedule can be efficiently performed, which solves the aforementioned problems.

Furthermore, in the present invention, the aforementioned problems are solved by providing an apparatus, having a scheduler embodied on a computer readable medium, and a computer-program (i.e., scheduler) embodied on a computer readable medium, which respectively provides such methods.

BRIEF DESCRIPTION OF THE DRAWINGS

For a more complete understanding of the present invention and the advantages thereof, reference is now made to the following description taken in conjunction with the accompanying drawings.

FIG. 3 illustrates a table of maximum values of scheduling entries for each time slot.

FIG. 8 illustrates a table of time slots for processes, and a table, in which process identifiers are associated with the processes.

FIG. 9 illustrates another mode of the table of time slots for processes.

FIG. 15 illustrates a time frame control table, and a table for controlling maximum values of resources in the prior art.

FIG. 17 illustrates the content of a request in extended BNF.

FIG. 18 illustrates a table, in which a value of "cycle" is associated with its meaning (i.e., what the value actually represents in terms of operation of processes).

FIG. 20 illustrates the time frame control table for "each day/each month," the time frame control table for "each week," the table for controlling the maximum number of reservation for "each day/each month," and the table for controlling the maximum number of reservation for "each week."

PREFERRED EMBODIMENTS OF THE INVENTION

Preferred embodiments of the present invention will be described with reference to the drawings.

Figure 1:
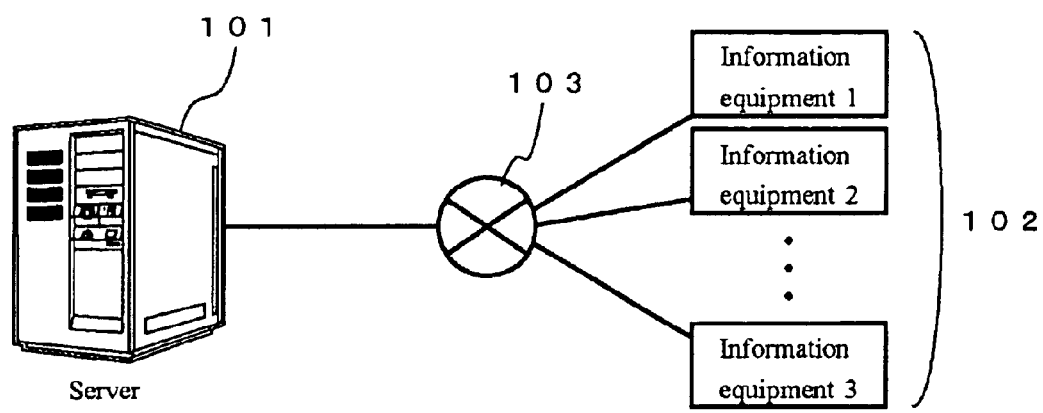
FIG. 1 is a schematic view of the present invention.

FIG. 1 exemplifies a client-server environment, in which the present invention is used, in which a server 101 can communicate with information equipment (information consumer electronics products represented by an information consumer electronics terminal, for example) 102 that are the client apparatuses made up of a large number of units, via a communication network 103. The server 101 communicates in the same time slot to each information equipment every time a specified number of days passes and transmits control instruction that performs function setting of the information equipment, collecting log for operation, or the like. Examples of such information equipment are; a personal computer; a television (including a digital television); a radio; a compact disk player; a cassette tape recorder; a telephone; a refrigerator; a microwave oven; an oven; a toaster; a cooking heater; a laundry machine; a drying machine; an electric kotatsu (a Japanese style table, covered by blanket, with a foot warmer); an electric heating pad; an electric blanket; an electric bed sheet; an electric heater; an air conditioner; a clock; a fan; a lighting apparatus; and the like. In the present invention, "to perform processes in the same time slot every time a specified period passes" means that the processes are performed in the same time slot when a previously specified time, which is N days for example, passes, and the "time slot" is a particular time period in a unit period by which the specified period is measured. For example, if a "day" is used as the "unit period," the "time slot" is a particular time period in 1 day, and in this case, as an example "to perform processes in the same time slot every time a specified period passes" means that the server 101 in FIG. 1 performs communication processes with a particular information consumer electronic product in the time slot from 6:00 a.m. to 12:00 noon every time a specified period, which is every 15 days. "To bring the number of processes performed in the same time slot to the minimum" means to keen the number of processes in any time slot from standing out in a certain time slot when a process is newly added. In the following, although a description will be made based on the assumption that the "specified period" is a time having a "day" as a unit, "every time a specified period passes" means "every N days," and the "cycle of the specified period" is a "cycle of N days" for convenience of explanation, the time unit is not limited to the "day," and the present invention can be implemented on the time unit of an arbitrary length.

In the first embodiment, the method for creating a schedule comprises the steps of: calculating the table of maximum values respectively for the number of processes for each time slot; and calculating the time slot. The step of calculating the table of maximum values respectively for the number of processes for each time slot is a step of finding the table of maximum values respectively for the number of processes for each time slot, and the "table of maximum values respectively for the number of processes for each time slot" is a table that associates the maximum value of the number of processes, which is the maximum value for each time slot in relation to the number of processes processed in the cycle of N days, with the time slot, and stores said maximum value therein. For example, day 1 is divided into the time slots of every six hours, which is as follows: time slot 1 as the first time slot is from 00:00 to 05:59: time slot 2 as the second time slot is from 06:00 to 11:59: time slot 3 as the third time slot is from 12:00 to 17:59; and time slot 4 as the fourth time slot is from 18:00 to 23:59. The number of processes in each time slot of each day is identified in each cell of the table exemplified in FIG. 2, wherein the maximum value for each time slot in relation to the number of processes processed in the cycle of 3 days based on N as 3 is the maximum value of the number of processes processed in each time slot of every 3 days from Sep. 1, 2001, even 3 days from Sep. 2, 2001, and even 3 days from September 3. Such maximum values are associated with the respective storage time slots and stored therein to form the table of maximum values respectively for the number of processes for each time slot, and Table 301 of FIG. 3 exemplifies the table of maximum values respectively for the number of processes for each time slot when N is set to 3. In Table 301, the row of the "first day" stores the maximum value of the number of processes processed in each time slot in every 3 days from Sep. 1, 2001, that is, Sep. 1, 2001. Sep. 4. 2001, Sep. 7, 2001, and soon.

Figure 2:
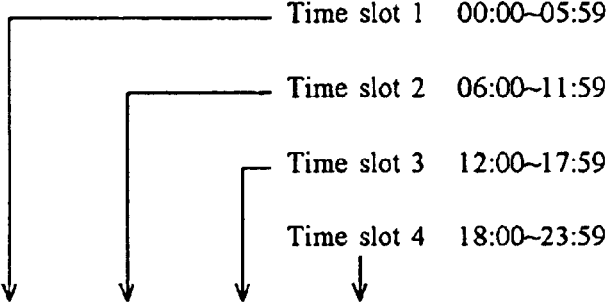
FIG. 2 illustrates a table, in which the number of scheduling entries in each time slot is stored for each date.

Although the table shown in FIG. 2 shows the number of processes performed by the time slot of a particular day, it may be a table that stores the number of processes executed by the time slot in relation to the first day, the second day, ..., the 365th day with 365 days as a cycle for example, not with the particular day such as Sep. 1, 2001.

Figure 4:
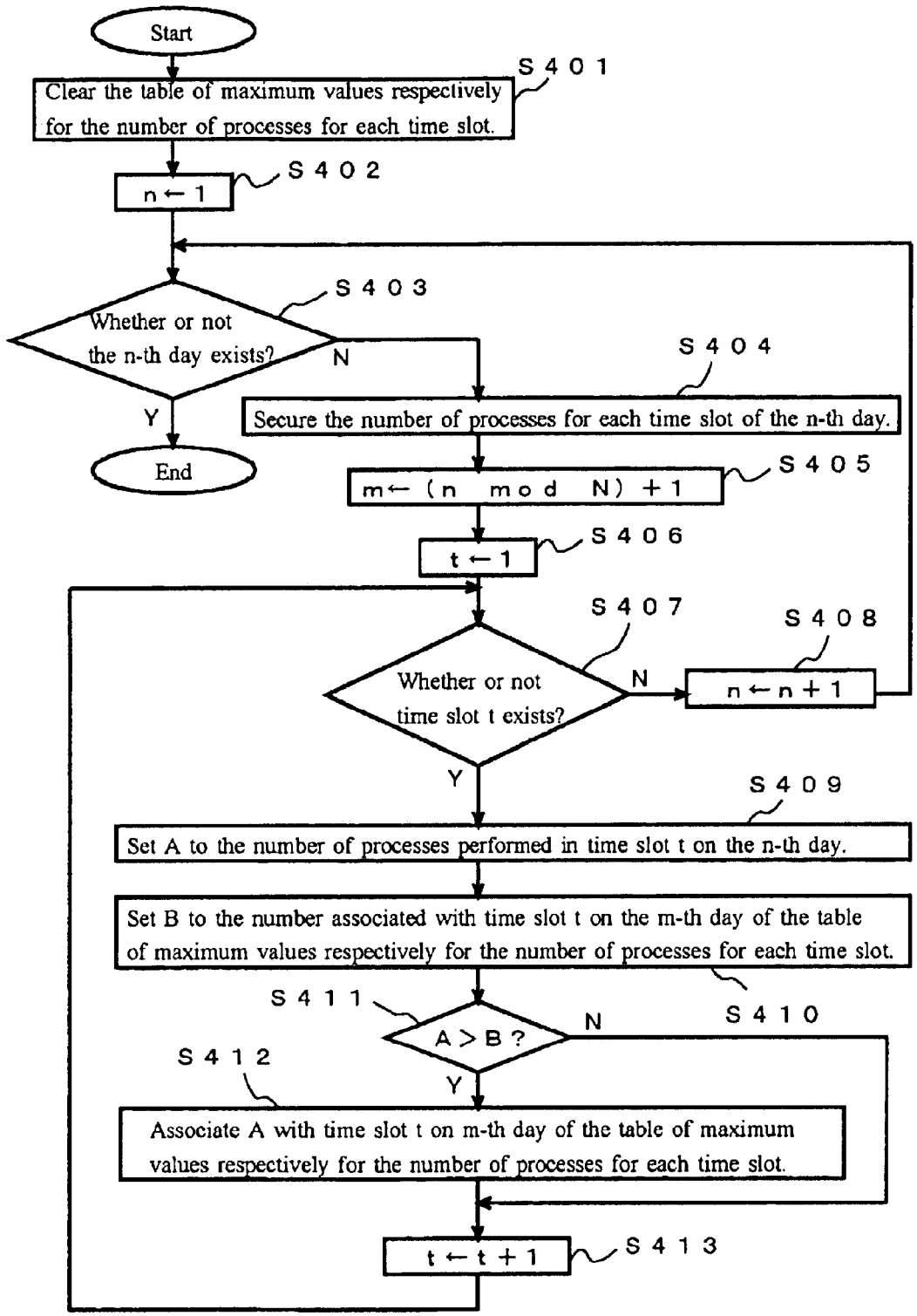
FIG. 4 is a flowchart explaining the operation to find the table of maximum values of scheduling entries for each time slot.

FIG. 4 is the flowchart explaining operation to find the table of maximum values respectively for the number of processes for each time slot in the step of calculating the table of maximum values respectively for the number of processes for each time slot. Before operation of FIG. 4 is performed, a table having the number of rows of N and the number of columns as many as the number of time slots of 1 day is prepared, the operation shown in the flowchart of FIG. 4 is performed for the table, and thus the table of maximum values respectively for the number of processes for each time slot is formed. In step S401, the table, which becomes the table of maximum values respectively for the number of processes for each time slot, is cleared. In other words, 0 is stored in all boxes of the table. In step S402, substitute variable n that specifies each day for 1. In step S403, whether or not the n-th day exists is determined (specifically, whether or not a row that corresponds to the n-day exists is determined), the operation ends if such row does not exist, and the operation proceeds to step S404 if the n-th day exists.

In step S404, the number of processes of each time slot of the n-th day is retrieved. In step S405, substitute a variable with (n mod N)+1, that is, a value in which 1 is added to a remainder obtained when a value stored in the variable n is divided by N. The m shows that the n-th day corresponds to the m-th day in the table of maximum values respectively for the number of processes for each time slot. In step S406, substitute the variable t showing the time slot for 1, and the process number of processes of time slot 1, time slot 2, and so on is brought out from the process number of processes of each time slot of the n-th day acquired in step S404.

In step S407, whether or not time slot t exists is determined. If it does not exist, the operation proceeds to step S408 to increase the value of n only by 1 for the processes of the next day, and returns to step S403. If time slot t exists, the operation proceeds to step S409, and substitute variable A for the number of processes performed in time slot t of the n-th day. In step S410, it substitutes variable B with the number associated with time slot t of the m-th day, which is stored in the current table of maximum values respectively for the number of processes for each for each time slot. In step S411, whether or not the value substituted for A is larger than the value substituted for B is determined. If it is not larger, the operation jumps to step S413, and if it is larger, the operation proceeds to step S412 to associate the value substituted for A with time slot t of the m-th day in the current table of maximum values respectively for the number of processes for each time slot and store it therein, and proceeds to step S413. In step S413, the value oft is increased by 1 to perform the processes of the next time slot, and the operation returns to step S407.

The step of calculating a time slot is a step to find a time slot that stores the minimum number among the maximum values of the respective number of processes stored in the table of maximum values respectively for the number of processes for each time slot, which has been found in the step of calculating the table of maximum values respectively for the number of processes for each time slot. Specifically, the step finds the time slot that stores the minimum number among the numbers associated with the time slot and stored in the table of maximum values respectively for the number of processes for each time slot. In this step, the "time slot that stores the minimum number among the the maximum values respectively for the number of processes" not only means a time slot in 1 day but also means a time slot in a day in the cycle of N days.

Figure 5:
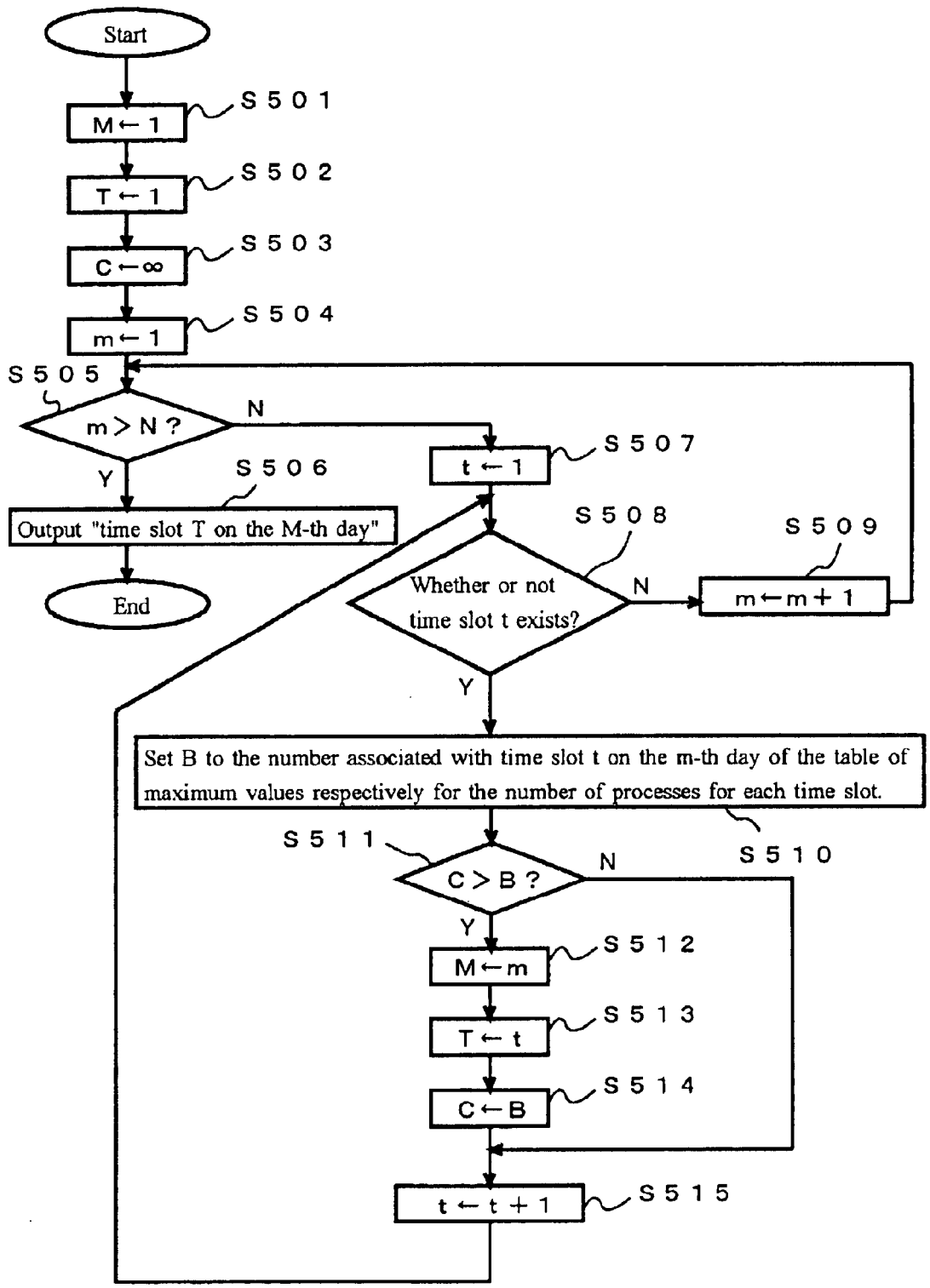
FIG. 5 is a flowchart explaining the step of calculating a time slot.

FIG. 5 is the flowchart explaining the operation of the step of calculating the time slot. In steps S501 and S502, place 1 into variable M and variable T, respectively. What is obtained as a result of the operation of the flowchart of FIG. 5 is the maximum value of the number of processes of a time slot of a day in the cycle of N days, which is at a minimum, wherein variable M expresses said day, and variable T expresses said time slot. In step S503, place .infin. into variable C (.infin. is larger than any integer). Variable C stores the minimum value among the maximum values respectively for the number of processes of an area of the table of maximum values respectively for the number of processes for each time slot, which has been scanned in the middle of executing the operation in the flowchart. In step S504, place 1 into variable m. Variable m is a variable that expresses the row of the day which is being noted in the table of maximum values respectively for the number of processes for each time slot. In step S505, whether or not m is larger than N is determined. If m is larger than N, it means that all of the table of maximum values respectively for the number of processes for each time slot has been scanned, and "time slot T of the M-th day" is outputted to display the maximum value of the number of processes of time slot T of the M-th day.

In step S505, if m is not larger than N, it means that there is an area to be scanned in the table of maximum values respectively for the number of processes for each time slot, and the operation proceeds to step S507 to insert 1 into variable t. Variable t expresses the maximum value of the number of process of the t-th time slot among the time slots, which is being noted. In step S508, it determines whether or not time slot t exists, or in other words, whether or not there is still a time slot to be checked with. If time slot t does not exist, the operation proceeds to step S509 to increase the value of variable m by 1, and then the table of maximum values respectively for the number of processes for each time slot of the next day is scanned.

If time slot t exists in step S508, the operation proceeds to step S510 and substitutes variable B with the maximum value of the number of processes, which is associated with, and stored in time slot t of the m-th day in the table of maximum values respectively for the number of processes for each time slot. The values of C and B are compared in step S511, and the operation jumps to step S514 if C is not larger than B. If C is larger than B, that is, if B is smaller than C, it means that B is a smaller value than the minimum value among the maximum values of the respective number of processes, which have been obtained by scanning. Then, substitute M and T with m and t respectively in steps S512 and step S513, and substitute the value of B into C in step S514 because B is smaller than C.

In step S515, t is increased only by 1 to check the maximum value of the number of processes of the next time slot, and the operation returns to step S508.

If the new process is performed for the time slot that has been found by the method for smooth scheduling on a periodic basis in a client-server system for creating a schedule, which comprises: the step of calculating the table of maximum values respectively for the number of processes for each time slot; and the step of calculating a time slot, the load to the server apparatus can be minimized, or in other words, the apparatus can be prevented from being overloaded by an unbalanced load on a particular day or time slot. Further, in the step of calculating the table of maximum values respectively for the number of processes for each time slot, because the maximum value of the number of processes that is the maximum value for each time slot is found, which is not the sum of the respective number of processes processed in each time slot, the table shown in FIG. 2 becomes a table that stores the respective number of processes executed by each time slot for the first day, . . . , the second day and the 365th day with 365 days as a cycle for example. Moreover, even if N is not a number by which 365 days is divisible. e.g., 100, the present embodiment can prevent a case, in which the number inserted in the table of maximum values respectively for the number of processes for each time slot is not a natural number. More specifically, the present embodiment can prevent a case, wherein the sum of the respective number of processes of each time slot in relation to four days. i.e., the first day, the 101st day, the 201st day and the 301st day, is inserted into the row of the first day: the sum of the respective number of processes of each time slot of three days. i.e., the 100th day. 200th day, and the 300th day, is inserted into the row of the $100^{th}$ day; and an obviously smaller value than that of the first day is inserted into the row of the 100th day.

Furthermore, when the table shown in FIG. 2 is the a table that stores the number of processes executed by each time slot for the first day, the second day, . . . , and the 365th day with 365 days as a cycle, the table itself exemplified in FIG. 2 can be regarded as the table of maximum values of respectively for the number of processes for each time slot in the cycle of 365 days, a time slot, in which the maximum value of the number of processes in the cycle of 365 days, which is at the minimum, can be found in the step of calculating a time slot, and the schedule with the cycle of 365 days can be created in addition to creating a schedule with the cycle of N days.

Figure 6:
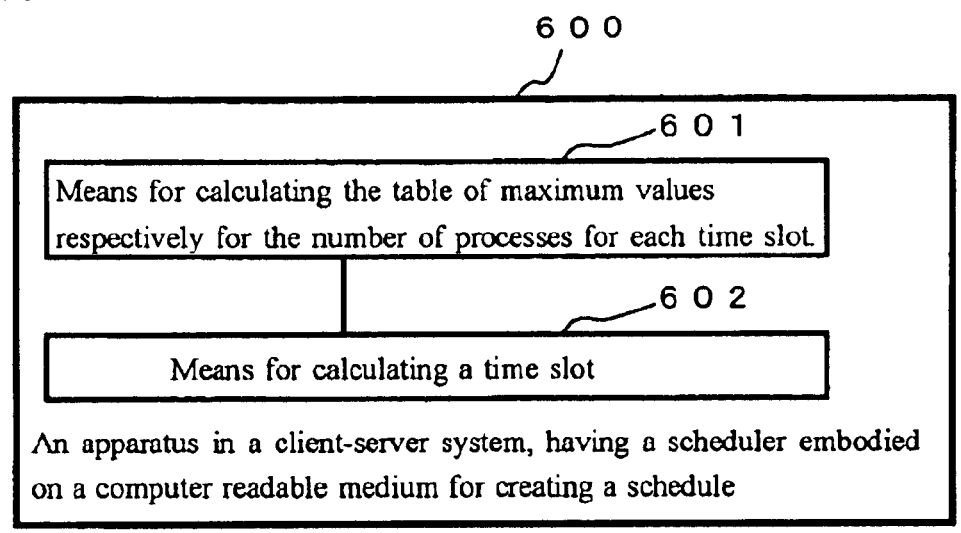
FIG. 6 is a functional block diagram of an apparatus, having a scheduler embodied on a computer readable medium, for creating the schedule in the first embodiment of the present invention.

Note that the method for smooth scheduling on a periodic basis in a client-server system, which creates a schedule in the embodiment can be realized by an apparatus in a client-server system, having a scheduler embodied on a computer readable medium for creating a schedule 600 that comprises a means 601 for calculating a table of maximum values respectively for the number of processes for each time slot; and a means 602 for calculating a time slot, whose functional block diagram is exemplified in FIG. 6. The means 601 for calculating a table of maximum values respectively for the number of processes for each time slot realizes the step of calculating the table of maximum values respectively for the number of processes for each time slot, and the means 602 for calculating a time slot implements the step of calculating the time slot.

Figure 7:
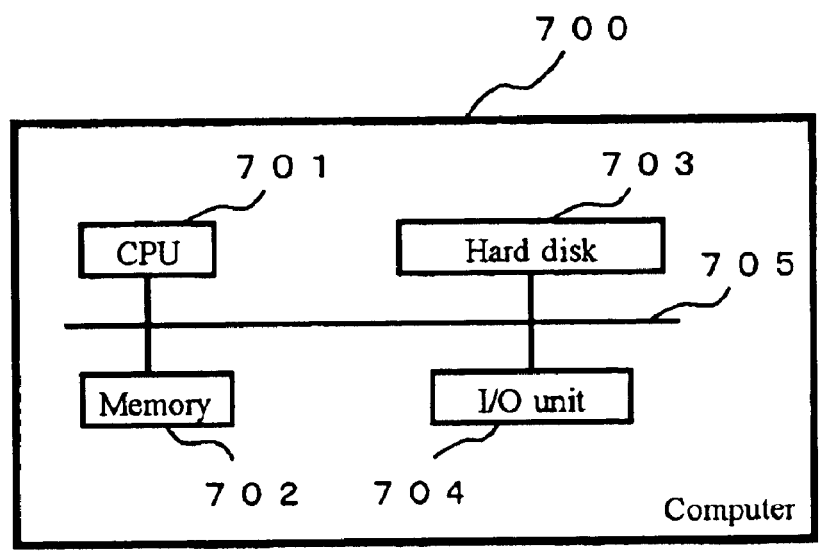
FIG. 7 is a functional block diagram of a computer that embodies the apparatus, having a scheduler embodied on a computer readable medium, for creating a schedule.

Such an apparatus for creating a schedule 600 can be implemented by using a computer. FIG. 7 exemplifies the functional block diagram of the computer 700, and the computer 700 includes; a CPU 701; a memory 702; a hard disk 703; an 110 unit 704, which are integrated by a bus 705 with each other. The hard disk 703 provides a function to hold contents to be held even if a power source of the computer is cut off. For example, it holds the table shown in FIG. 2 that holds the respective number of processes for each time slot of each day and stores a computer-program (i.e., scheduler) that causes the computer 700 to execute the step of calculating the table of maximum values of respectively for the number of processes for each time slot, and the step of calculating the time slot. Such a scheduler is loaded to the memory 702 and executed by the CPU 701. The 110 unit 704 is a display and a keyboard, respectively, which are used for inputting data of the table exemplified in FIG. 2, outputting result of the scheduler (the time slot found in the step of calculating a time slot), or the like.

Further, the computer 700 includes a communication interface that communicates with the server 101, in which the contents of the table exemplified in FIG. 2 is transmitted to the computer 700 and the computer 700 may transmit the result of scheduler for the table to the server 101.

In the second embodiment of the present invention, the processes performed in the same time slot every N days in the first embodiment are performed based on a table of time slots for processes, wherein a time slot, in which processes are performed, is associated with the process identifier, which is an identifier, held in said table, to identify the respective process to be performed in the time slot.

Table 801 of FIG. 8 exemplifies the table of the time slots for processes, in which the process identifiers (Process 0011 and the like) are held, indicating which processes should be performed in the time slots of each day. The processes identified by the process identifiers are respectively associated with the process identifiers and held in Table 802. As another mode of Table 801, FIG. 9 shows a table, in which process identifiers are respectively associated with the dates and the time slots, and stored therein, and such table may indicate the processes to be carried out, which are identified by the respective process identifiers in a time slot of a certain date.

Figure 10:
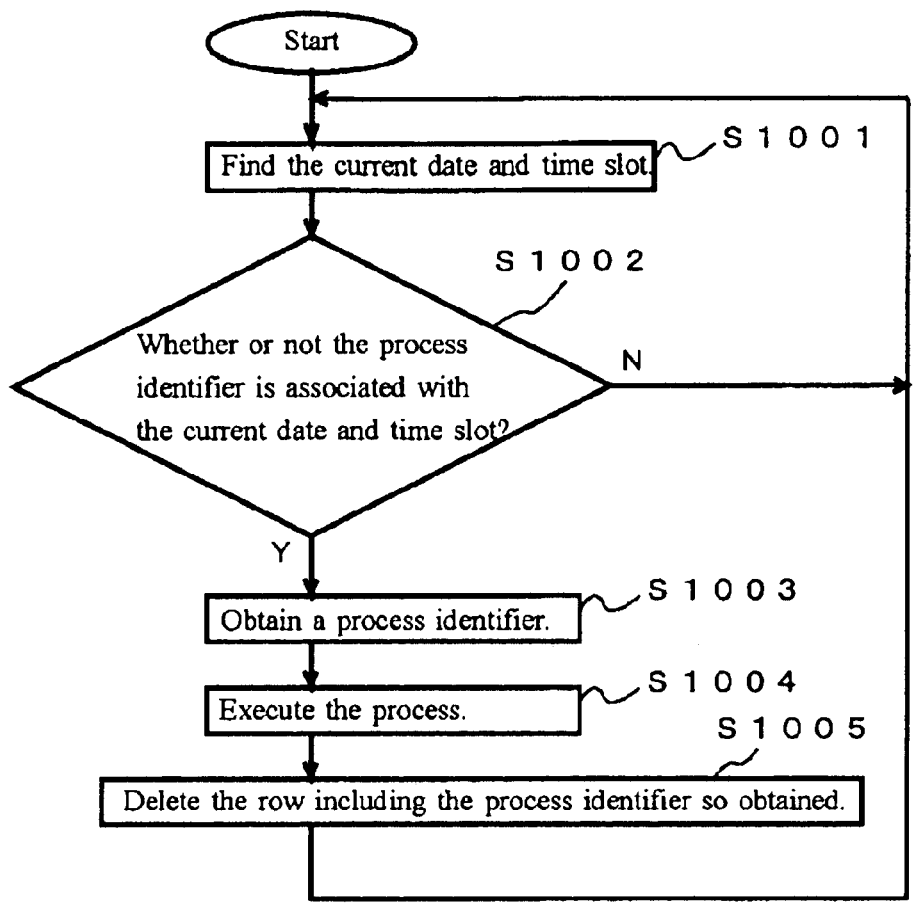
FIG. 10 is a process flowchart in the case of performing process that is identified by the process identifier by using the table of time slots for processes.

FIG. 10 is a flowchart, in which processes are performed based on the table of time slots for processes of this embodiment, and in which the current date and the time slot are found in step S1001 at first. In step S1002, whether or not a process identifier is associated with the current date and the time slot found in step S1001 is determined. Regarding this determination, the table of FIG. 9 is retrieved by the date and time slot, and the determination is made depending on whether the retrieved result exists or not. If there is no associated process identifier, the operation returns to step S1001 because the process to be performed does not exist.

If the process to be performed exists, it moves to step S1003 to obtain a processing. In step S1004, the the process is obtained from the process identifier obtained in step S1003 out of Table 802, in which process identifiers are associated with the respective processes, and it is executed. In step S1005, the row including the processing identifier obtained in step S1003 is deleted, and the operation returns to step S1001.

In this embodiment, the process is performed based on the table of processes as described herein, and the method for smooth scheduling on a periodic basis in a client-server system, which creates a schedule, further includes; a step of accepting a process identifier; and a step of associating a process identifier. The step of accepting a process identifier is a step of accepting the process identifier. The step of associating a process identifier is a step of associating the process identifier, accepted by the step of accepting the process identifier, with the time slot found in the step of calculating the time slot and holding it in the table of time slots for processes. When the table of time slots for processes is in the mode exemplified in Table 901 of FIG. 9, a row, which includes a date, a time slot and a process identifier, is inserted into Table 901. For example, when N is 3, and the process identifier is Process 1234 (selected for the sake of illustration) with time slot 3 of the second day, which has been found in the step of calculating the time slot, the rows, such as (Sep. 2, 2001, 3. Process 1234). (Sep. 5, 2001, 3. Process 1234). (Sep. 8, 2001, 3. Process 1234), and so on, are inserted. Note that the insertion of rows may continue up to the place where a date does not exist in the table exemplified in FIG. 2. For example, the operation may end in the middle by the third time. i.e., Sep. 8, 2001, although the dates until Sep. 30, 2001 are in the table exemplified in FIG. 2.

Figure 11:
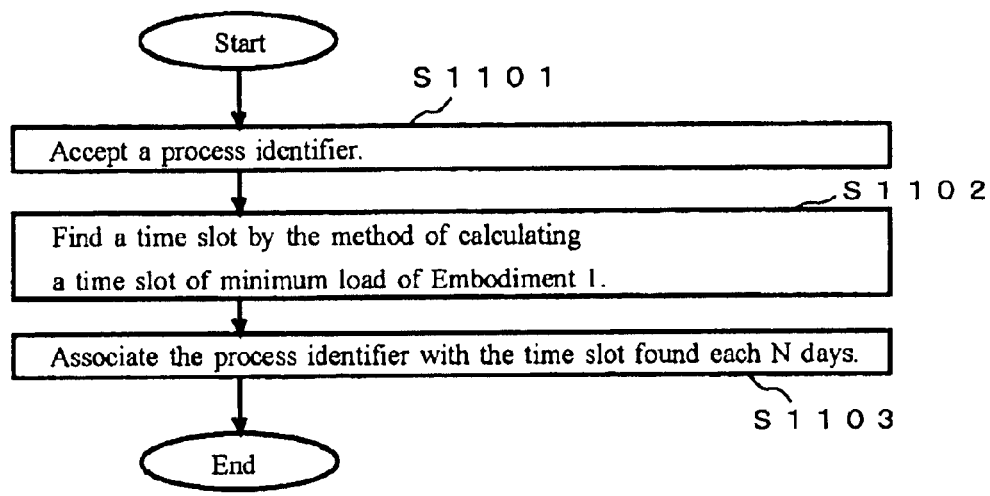
FIG. 11 is a process flowchart of the method for smooth scheduling on a periodic basis in a client-server system, which creates a schedule in the second embodiment of the present invention.

FIG. 11 exemplifies the flowchart of the method for smooth scheduling on a periodic basis in a client-server system, which creates a schedule within the framework of this embodiment, which accepts the processing identifier in step S1101. For example, in the case where the method for creating a schedule of this embodiment is realized by a computer 700, the I/O unit 704 accepts the, process; the process identifier is determined at the tune of inserting it in Table 802; and the process identifier, which has been determined at that time, is accepted.

In step S1102, the method for smooth scheduling on a periodic basis in a client-server system, which creates a schedule in Embodiment 1, finds the time slot.

In step S1103, the time slot found for every N days is associated with the process identifier. Specifically, the rows, such as (Sep. 2, 2001, 3, Process 1234), (Sep. 5, 2001, 3, Process 1234), (Sep. 8, 2001, 3, Process 1234), and so on, are inserted, as described above.

Figure 12:
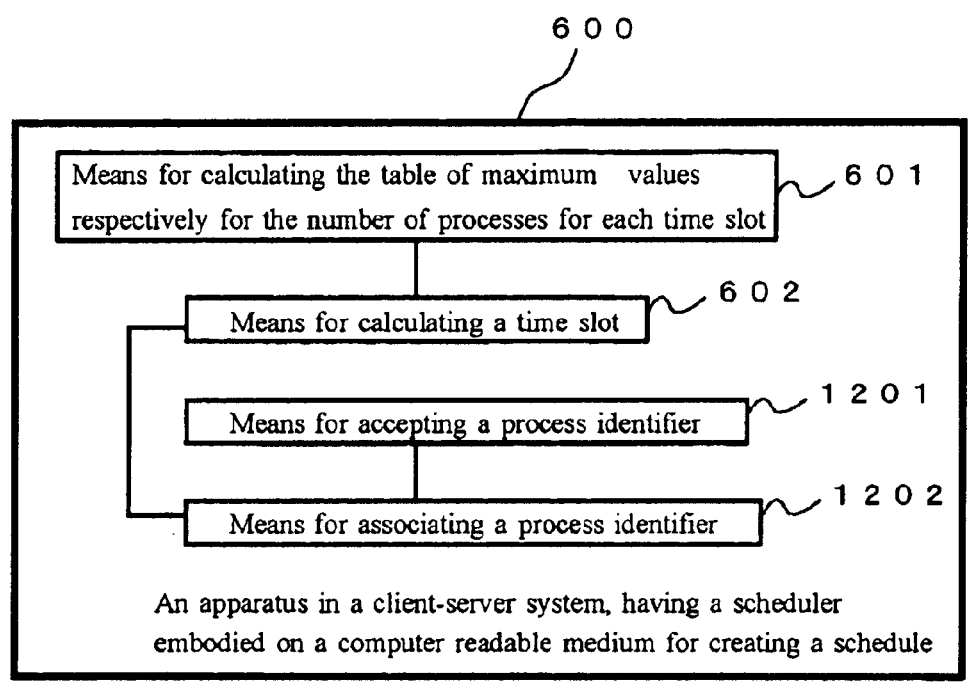
FIG. 12 is a functional block diagram of an apparatus, having a scheduler embodied on a computer readable medium, for creating a schedule in the second embodiment of the present invention.

With this embodiment, the processes are associated with the time slot so that the load to the server is minimized, and the processes are accordingly executed, thereby minimizing the load to the server. The method for smooth scheduling on a periodic basis in a client-server system in this embodiment can be realized by an apparatus in a client-server system, having a scheduler embodied on a computer readable medium, for creating a schedule 600 shown in FIG. 12. In FIG. 12, an apparatus in a client-server system, having a scheduler embodied on a computer readable medium, is one in which a means 1201 for accepting a process identifier, and a means 1202 for associating a process identifier are added to the apparatus in Embodiment 1. The means 1201 for accepting a process identifier realizes the step of accepting a process identifier, which transmits the process identifier accepted to the means 1202 for associating a process identifier. The means 1202 for associating a process identifier receives the time slot from the means 602 for calculating a time slot, receives the process identifier from the means 1201 for accepting a process identifier, and thus realizes the step of associating a process identifier.

In the third embodiment, provided is a method for smooth scheduling on a periodic basis in a client-server system for creating a schedule, which does not need to perform the step of calculating the table of maximum values respectively for the number of processes for each time slot of the first embodiment every time. In this embodiment, the step of associating a process identifier is characterized in that the process identifier is associated and stored in the table of time slots for processes one by one, and the method for creating a schedule in this embodiment further includes the step of updating the respective maximum value of the number of processes.

The step of updating the respective maximum value of the number of processes is a step as follows: When the number of the processes identified by the process identifiers, which is associated with, and held in the time slot found in the step of calculating a time slot, is equal to the maximum value of the number of processes, which is associated with, and stored in the corresponding time slot of the table of maximum values respectively for the number of processes for each time slot, the maximum value of the number of processes, associated with, and stored in the time slot of the table of maximum values respectively for the number of processes for each time slot, is increased by one. "The number of the processes identified by the process identifiers, which is associated with, and held in the time slot found in the step of calculating a time slot" is the number of the processes identified by the process identifiers, which is associated with the time slot found in the step of calculating a time slot in the table of time slots for processes before the process identifier is newly associated in the step of associating a process identifier. The step for updating the respective maximum value of the number of processes is described using examples as follows. For example, when N is set to 3, time slot 3 of the second day is found in the step of calculating a time slot, and the two rows, such as (Sep. 2, 2001, 3, Process 1234) and (Sep. 5, 2001, 3, Process 1234), are inserted in Table 901 of FIG. 9, the number of processes performed in time slot 3 on Sep. 2, 2001 is found first before inserting (Sep. 2, 2001, 3, Process 1234). The number of processes can be found by retrieving Table 901 of FIG. 9 for the number of rows, in which the time slots are in three columns on Sep. 2, 2001. Then, the operation checks as to whether or not the number of processes, which has been found (the number should be P), is equal to the maximum value of the number of processes, which is associated with, and stored in time slot 3 on the second day in the table of maximum values respectively for the number of processes for each time slot. In case they are equal, since the maximum value of the number of processes is increased by 1 by way of insertion of (Sep. 2, 2001, 3, Process 1234), the number, which is associated with, and stored in time slot 3 on the second day in the table of maximum values respectively for the number of processes for each time slot as the maximum value of the number of processes, is increased by 1, and (Sep. 2, 2001, 3, Process 1234) is inserted. In case they are not equal, according to the definition of the maximum value of the number of processes, P is smaller than the maximum value of the number of processes associated with, and stored in time slot 3 on the second day in the table of maximum values respectively for the number of processes for each time slot, and since the maximum value of the number of processes does not change even in case of inserting (Sep. 2, 2001, 3, Process 1234). (Sep. 2, 2001, 3, Process 1234) is simply inserted therein.

Figure 13:
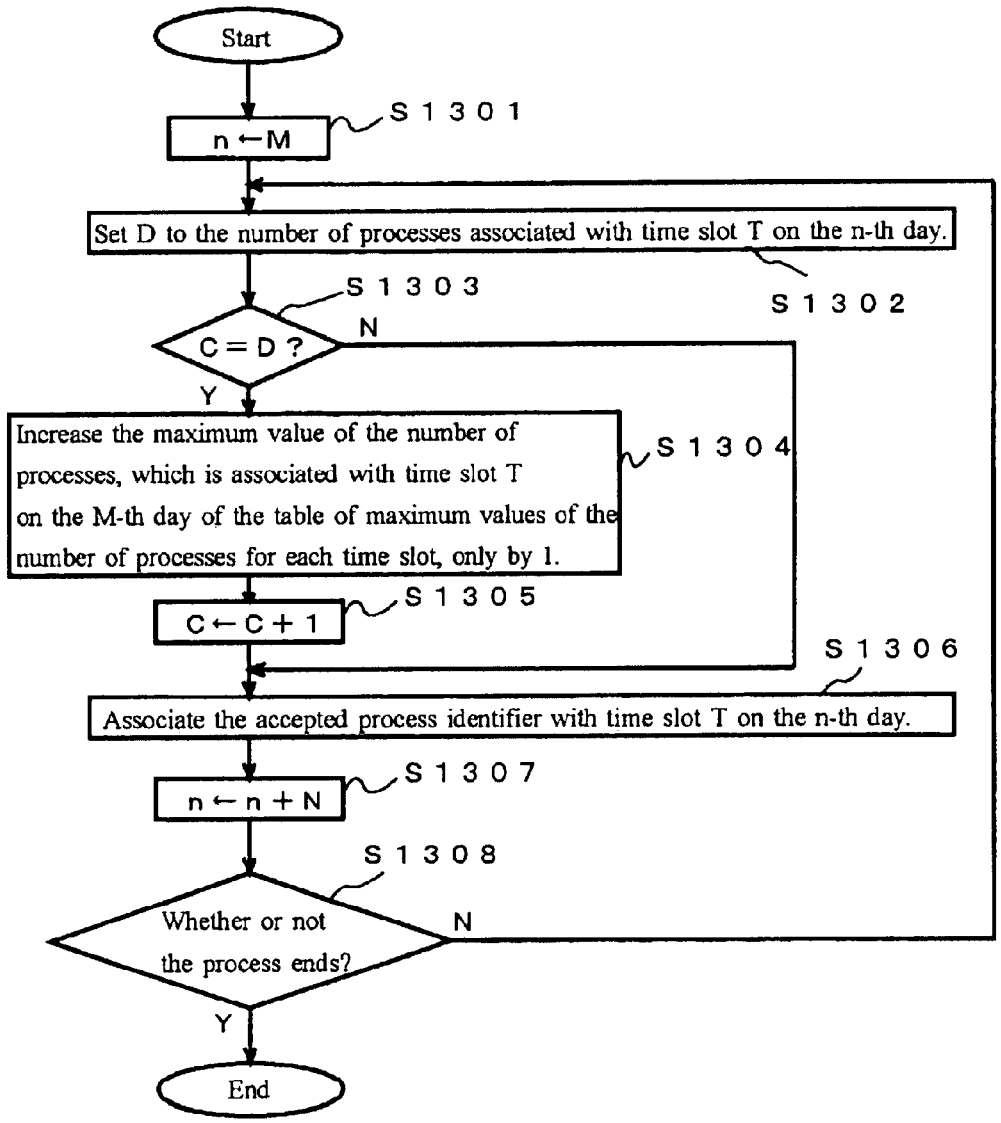
FIG. 13 is a process flowchart of the step of updating the respective maximum value of the number of processes, and the step of associating a process identifier in the third embodiment of the present invention.

FIG. 13 exemplifies the flowchart of the operation of updating the maximum value, and the step of associating a process identifier within the framework of this embodiment. In step S1301, substitute n for M. Reference code M is a value that expresses the M-th day of a certain time slot, which has been found in the step of calculating a time slot. Further, the value that expresses the time slot of said day is T. In step S1302, insert the number of the processes associated with time slot T on the n-th day into variable D. The number of processes associated with time slot T on the n-th day can be found by retrieving Table 901 of FIG. 9 as described above. In step S1303, whether or not C and D are equal to each other is determined. Reference code C is a variable that stores the maximum value of the number of processes associated with, and stored in time slot t on the M-th day in the table of maximum values respectively for the number of processes for each time slot. If C and D are different, the operation jumps to step S1306 because C<D holds according to the definition of the maximum value of the number of processes. If C and D are the same, the operation proceeds to step S1304 to increase only by one the maximum value of the number of processes, which is associated with, and stored in time slot T on the M-th day in the table of maximum values respectively for the number of processes for each time slot. In step S1305, the value of variable C is increased by 1. Step S1306 is the step of associating a process identifier, which associates time slot T on the n-th day with the process identifier. In step S1307. N of the cycle is added to variable n. In step S1308, whether or not association of a process identifier has ended is determined, the entire operation ends when it has ended, and the operation returns to step S1302 if not.

With this embodiment, a task to find the table of maximum values respectively for the number of processes for each time slot is reduced, and thus operation of creating a schedule can be efficiently performed.

Figure 14:
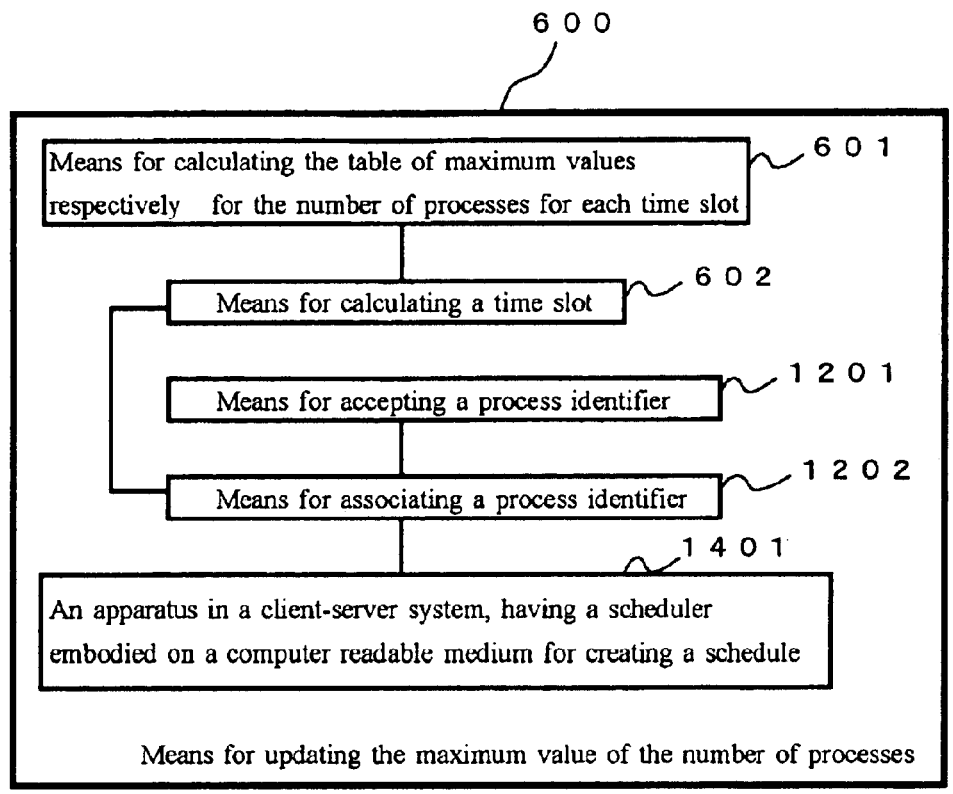
FIG. 14 is a functional block diagram of the apparatus, having a scheduler embodied on a computer readable medium, for creating a schedule in the third embodiment of the present invention.

Note that the method for smooth scheduling on a periodic basis in a client-server system for creating a schedule in this embodiment can be realized by an apparatus in a client-sever system, having a scheduler embodied on a computer readable medium, for creating a schedule 600 as exemplified in FIG. 14. The apparatus 600 exemplified in FIG. 14 is one in which a means 1401 for updating the maximum value of the number of processes is added to the apparatus of Embodiment 2. The means 1401 for updating the maximum value of the number of processes is a means to realize the step of updating the maximum value of the number of processes.

Figure 16:
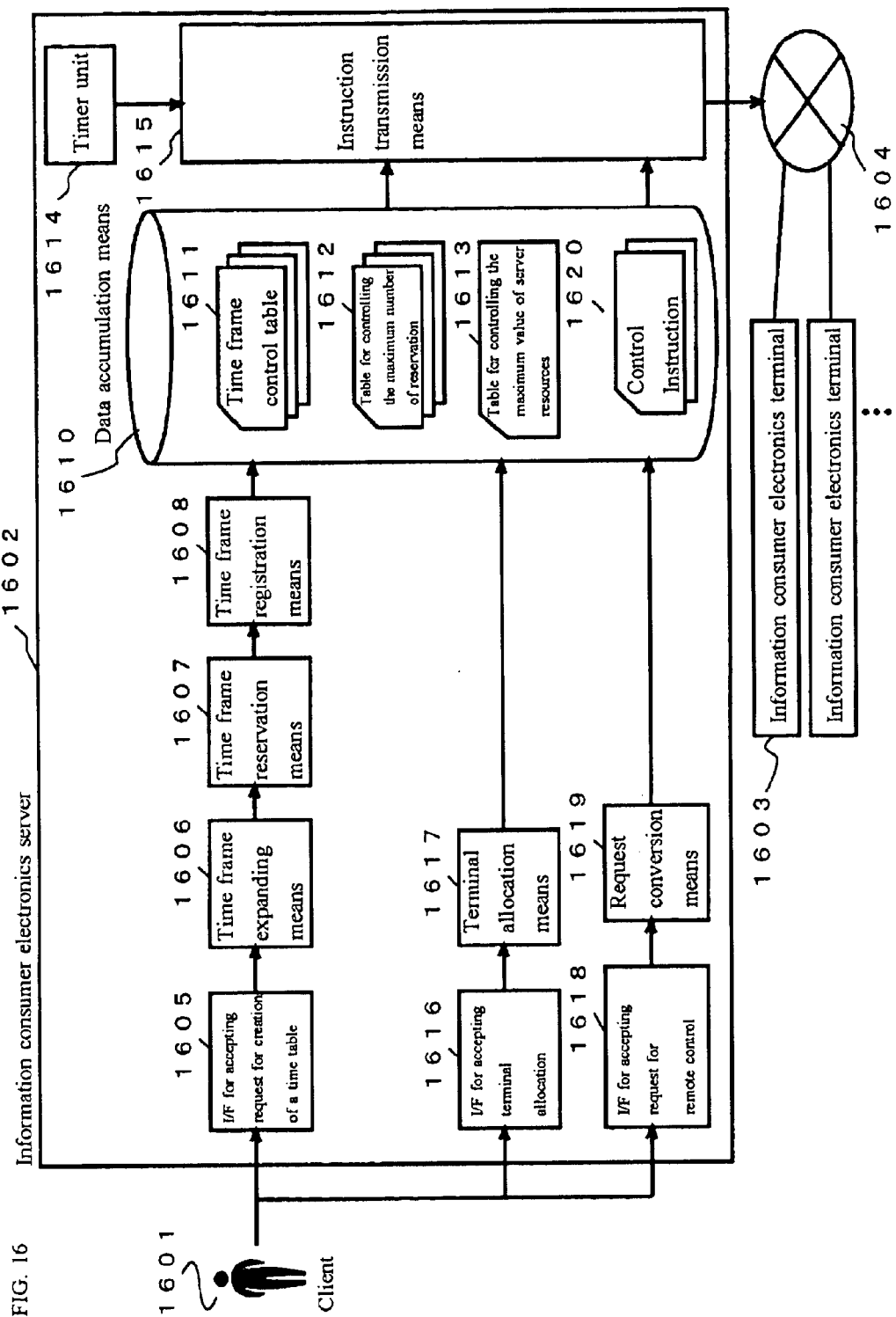
FIG. 16 is a functional block diagram of the client-server environment, in which an information consumer electronics server is connected with information consumer electronics terminals.

FIG. 16 is a functional block diagram of a server within the framework of this embodiment, which is configured with information equipment. In this diagram, although the server is shown as an information consumer electronics server, it may be a server for general information equipment. In FIG. 16, reference numeral 1601 denotes a client who requests remote control of the information consumer electronics terminal, which is information equipment, to the information consumer electronics server. The information consumer electronics server 1602 creates a schedule of the control instruction corresponding to the client's request and transmits the control instruction to an information consumer electronics terminal specified by the client on a day and time specified by the client, which has a mode that includes the foregoing apparatus for creating a schedule. Reference numeral 1603 denotes an information consumer electronics terminal that receives the control instruction transmitted from the information consumer electronics server, and renders to execute the control instruction. The reference numerals in the diagram are explained as below: a network 1604 that connects the information consumer electronics server with the information consumer electronics terminals: an I/F 1605 for accepting a request for creating a time table from the client by the information consumer electronics server; a time frame expanding means 1606, which expands the time frame of an effective range, in order to perform resource control for each time frame based on the request, which the I/F for accepting a request for creating a time table has accepted; a time frame reservation means 1607, which secures reservation of resources for each time frame; a time frame registration means 1608 that registers the time frame, whose reservation has been secured in the time frame reservation means, with the time frame control table in the data accumulation means; a data accumulation means 1610 that accumulates and controls various types of electronic data represented by the so-called data base, a hard disk or the like; a time frame control table 1611 that controls the reservation status of resources for each time frame, and the allocation status of information consumer electronics terminals; a table 1612 for controlling the respective maximum number of reservation, which controls the respective number of reservation for each time slot in the corresponding time frame control table, and which exists per one time frame control table, or in other words, a table of maximum values respectively for the number of processes for each time slot of the first through third embodiments; a table 1613 for controlling the respective maximum value of resources of a server, which controls the maximum value of resources of the information consumer electronics server; a timer unit 1614 that continues to tick time in a specified interval: an instruction transmission means 1615 for the information consumer electronics terminal, which obtains the control instruction created for the information consumer electronics terminal from the control-instruction control DB, and transmits the control instruction to the information consumer electronics terminal when the day and the time obtained from the timer unit for the information consumer electronics terminal, controlled by the time frame control table, are at the day and the time of a time frame corresponding to the information consumer electronics terminal; an I/F 1616 for accepting allocation of a terminal, which becomes an interface to accent a terminal allocation request from the client by the information consumer electronics server; a terminal allocation means 1617 that performs allocation of information consumer electronics terminals by associating the information consumer electronics terminal specified by the client with a time frame in the time frame control table; an I/F 1618 for accepting a request for remote control, which becomes an interface to accent a remote control request from the client by the information consumer electronics server; a request conversion means 1619 that creates the control instruction, which corresponds with the remote control request, and registers it with the control instruction DB; and the control instruction 1620, in which the control request from the client is converted by the request conversion means into a form that can be rendered and executed by the information consumer electronics terminal.

Detailed description for each block that constitutes the information consumer electronics server 1602 will be made as follows.

The requests carried out by the client 1601 are as follows: a request for creating a time table; a request for terminal allocation; and a request for remote control. Moreover, the client transmits these requests to the I/F 1605 for accepting a request for creating a time table, the I/F 1615 for accepting terminal allocation, and the I/F 1617 for accepting a request for remote control of the information consumer electronics server, respectively.

In FIG. 16, although the client 1601 is placed outside the information consumer electronics server 1602, the effects described in this embodiment can be obtained even if a client is placed inside the information consumer electronics server 1602.

FIG. 17 illustrates the request that the client 1601 transmits to the I/F 1605 for accepting a request for creating a time table at the time of requesting a creation of a time table, which is expressed in the extended BNF. The "cycle" is a value specified to the information consumer electronics server when the client 1601 performs a cyclic repetition control to the information consumer electronics terminal.

FIG. 18 shows the correspondence between the value specified for the "cycle" and its meaning. In case where "2" is specified for the "cycle" of the request at the time of requesting a creation of a time table, the processes in the information consumer electronics server 1602 are based on "each month." For example, the time frame control table 1611 registered by the time frame registration means 1608 has the attribute of "each month." "The period of control day and time" is information necessary to calculate the reference day and time in case where the information consumer electronics server 1602 performs remote control to the information consumer electronics terminal 1603 in a cyclical timing. "The reference day and time of control," which is the first parameter of the "period of control day and time" distributes the server resources using the day and time as a reference. "The distribution length," which is the second parameter, is the length of the range by which the server resources are distributed. "The number of terminals for reservation" shows the number of information consumer electronics terminals reserved in a newly created time frame control table.

Figure 19:
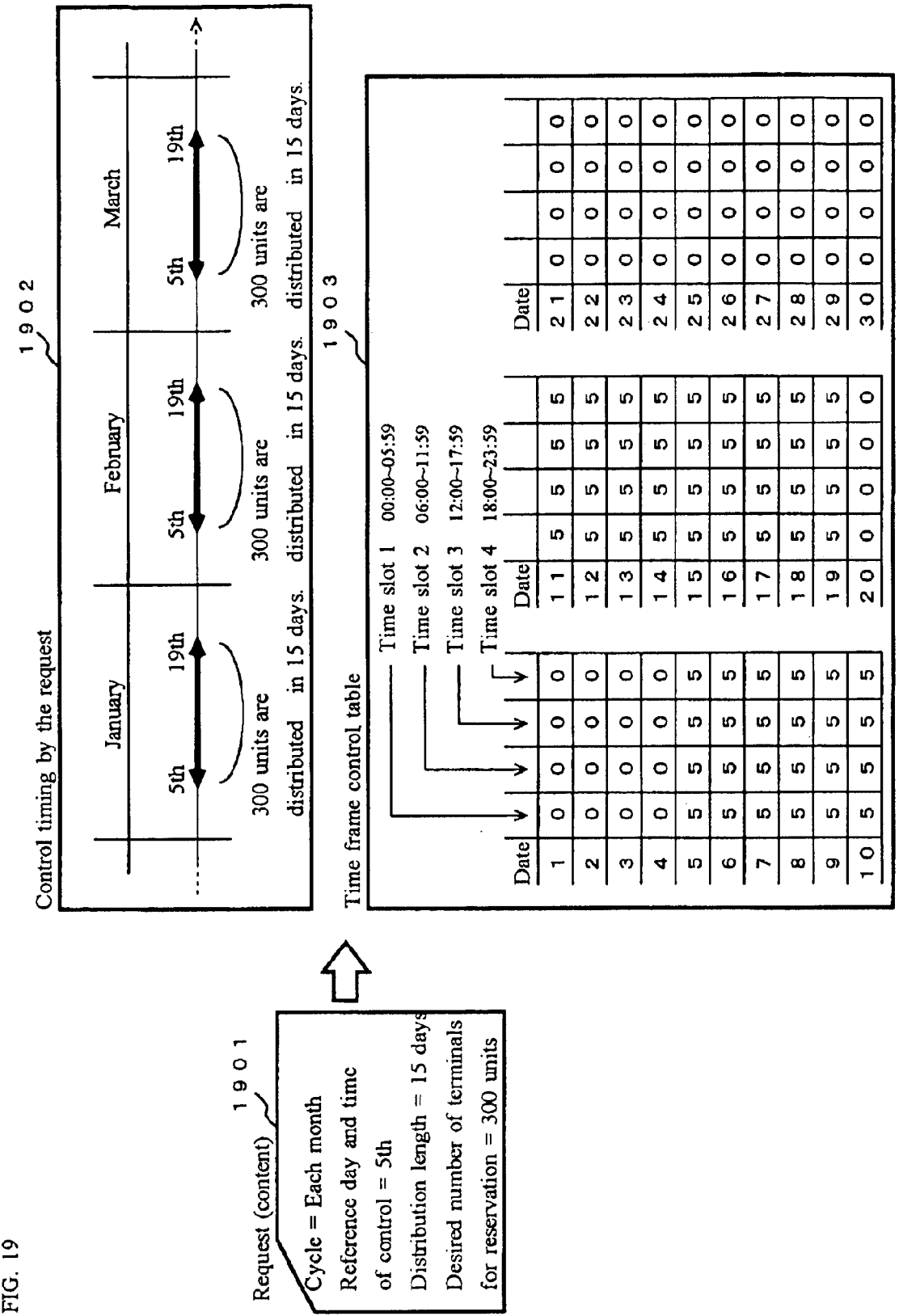
FIG. 19 illustrates the content of a request at the time of requesting to create a time table, the control timing to be implemented by the request, and the reservation status of the time frame control table so created.

The time frame control table created according to the request for creating a time table is one in which the information consumer electronics terminals of the "desired number of terminals for reservation" are distributed in the range of the "distribution length" from the "reference day and time of control." FIG. 19 shows the content of the request at the time of requesting a creation of a time table, a timing of control that the request means, and the reservation status of the time frame control table so created. In the case of the request 1901, the information consumer electronics server performs remote control on a specified day and time every month to the individual information consumer electronics terminal. Distribution of server resources is performed in the range of the "distribution length" from the "reference day and time of control." The time slots, in which 1 day is divided in to quarters (time slot 1=00:00 to 05:59, time slot 2=06:00 to 11:59, time slot 3=12:00 to 17:59, time slot 4=18:00 to 23:59), are used as an example of the time frame, since the "desired number of terminals for reservation"=300 units are distributed in the time frames of 15.times.4=60, the reservation status in the range is 300.div.60=5 reservations. The reservation status in other area is: the reservation number=0.

Herein, the length of the range of the time slot, controlled by the table for controlling the maximum number of reservation, will be described. Regarding the "cycle" processed by the information consumer electronics server in this embodiment, three types of "cycles." which are "each day," "each week" and "each month" as shown in FIG. 18, can be specified as a request. In this ease, the ranges of common divisors in each cycle are: 1 day (=24 hours), 8 hours, 6 hours, and the like in the case of "each day;" 7 days, 1 day (=24 hours), 8 hours, 6 hours, and the like in the ease of "each week;" and 30 days, 1 day (=24 hours), 8 hours, 6 hours, and the like in the case of "each month." Accordingly, in order to bring the range of time slots controlled by the table for controlling the maximum number of reservation to the range having the common divisor among a plurality of cycles, a length of 1 day (a length of 24 hours), which is the range of the greatest common divisor among the respective cycles, has been selected as the range of time slots controlled by the table for controlling the maximum number of reservation in this embodiment.

Further, although the time slot, where in which the length of 1 day (the length of 24 hours) is divided into quarters, is used as an example in this embodiment, the length of 1 day (the length of 24 hours) can be divided into 86,400 equal parts to control it on the time scale of seconds; 1,440 equal parts to control it on the time scale of minutes; and 24 equal parts to control it on the time scale of hours. Generally, the length of the range of the greatest common divisor is divided equally by a unit of a divisor by which the length is equally divisible.

Furthermore, when the length of the range of time slots controlled by the table for controlling the maximum number of reservation is set to the length of 1 day (the length of 24 hours), the "cycles" of "each day" and "each month" are in an inclusive relation in fact, and thus they can be controlled by the same time frame control table.

On the other hand, in the case of the "cycles" of "each month" and "each week," the cycles are not in an inclusive relation because even when the first day of a month is Monday, the first day of the next month is not necessarily Monday.

Accordingly, when three types of "cycles," i.e., "each day," "each week" and "each month," can be specified as the request as shown in FIG. 18, the time frame control tables controlled by the information consumer electronics server 1602 are two types: the time frame control table that jointly controls "each day/each month," and the time frame control table that controls "each week." Moreover, the data accumulation means 1610 controls the above two types of time frame control tables as time frame control tables 1611. In the same manner, by way of the data accumulation means 1610, the table for controlling the maximum number of reservation controls the following two types of tables as tables 1612 for controlling the maximum number of reservation: the table for controlling the maximum number of reservation, which jointly controls "each day/each month;" and the table for controlling the maximum number of reservation, which controls "each week."

FIG. 20 shows examples of a time frame control table 2001 for "each day/each month;" a time frame control table 2003 for "each week," a table 2002 for controlling the maximum number of reservation for "each day/each month;" and a table 2004 for controlling the maximum number of reservation for "each week," which are respectively controlled by the data accumulation means 1610.

In this embodiment, since the time slots, wherein a day is divided into quarters (time slot 1=00:00 to 05:59, time slot 2=06:00 to 11:59, time slot 3=12:00 to 17:59, time slot 4=18:00 to 23:59), are used as an example of the time frame, there are four time slots for 1 day so divided in each time frame control table.

In addition, since the length of the range of time slots controlled by the table for controlling the maximum number of reservation is set to the length of 1 day (the length of 24 hours) in the similar manner, each table for controlling the maximum number of reservation has the length of 1 day (the length of 24 hours) as the length of the range of time slot, and has a time frame which is a time slot of the quartered day.

When the I/F 1605 for accepting a request for creation of a time table receives the request for creation of a time table, it outputs the content of the request to the time frame expanding means 1606.

The time frame expanding means 1606, by using as an input the content of the request for creation of a time table, which the I/F 1605 for accepting a request for creation of a time table outputs, expands the time frame of an effective range, and outputs the table of flags of an effective range after expansion.

Figure 21:
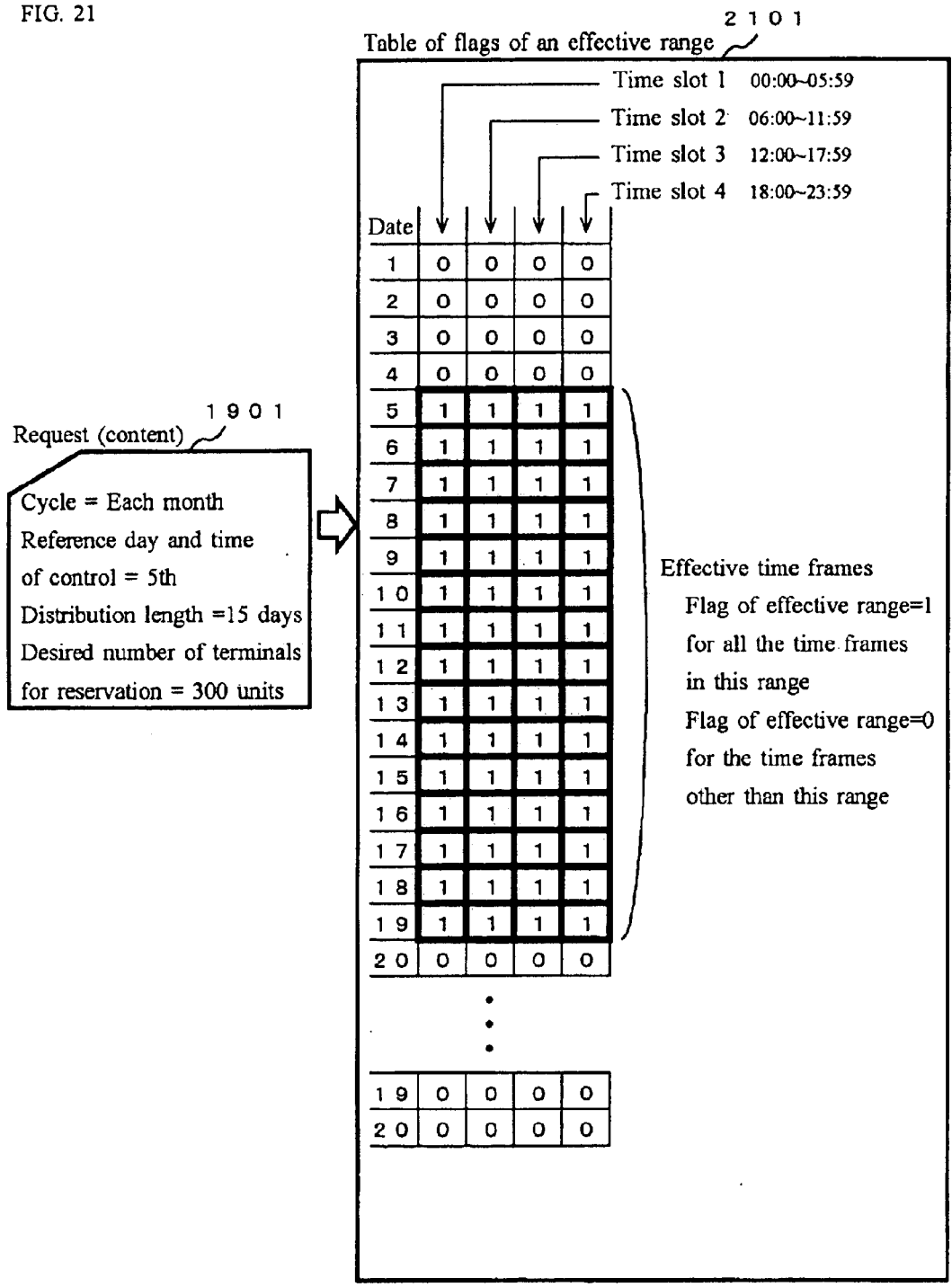
FIG. 21 illustrates a time frame control table, which is outputted by the time frame expanding means.

FIG. 21 shows an example of the time frame control table that the time frame expanding means 1606 outputs in the case of the request of FIG. 19. In FIG. 21, the time frames that correspond to the "distribution length" from the "reference day and time of control" of the request are in bold frames in the table 2101 of flags of an effective range. As described, regarding each time frame of the table of flags of an effective range that the time frame expanding means 1606 outputs, the time frames that correspond to the "distribution length" from the "reference day and time of control" are respectively set to "1" as a value meaning that said frame is included in the effective range, other time frames are set to "0" as a value meaning that they are not included in the effective range, and the table of flags of the effective range is outputted.

The time frame reservation means 1607 uses as an input the table of flags of an effective range, the time frame control table, and the table of the maximum number of reservation. By using them in such a manner, the time frame reservation means 1607 performs the operation of reservation and outputs the time frame control table 1611, and the table 1612 for controlling the maximum number of reservation after performing said reservation.

The operation in the time frame reservation means 1607 varies depending on the "cycle" of the request so specified. Description will be made for the case, in which "each week" is specified for the "cycle" of the request.

Figure 22:
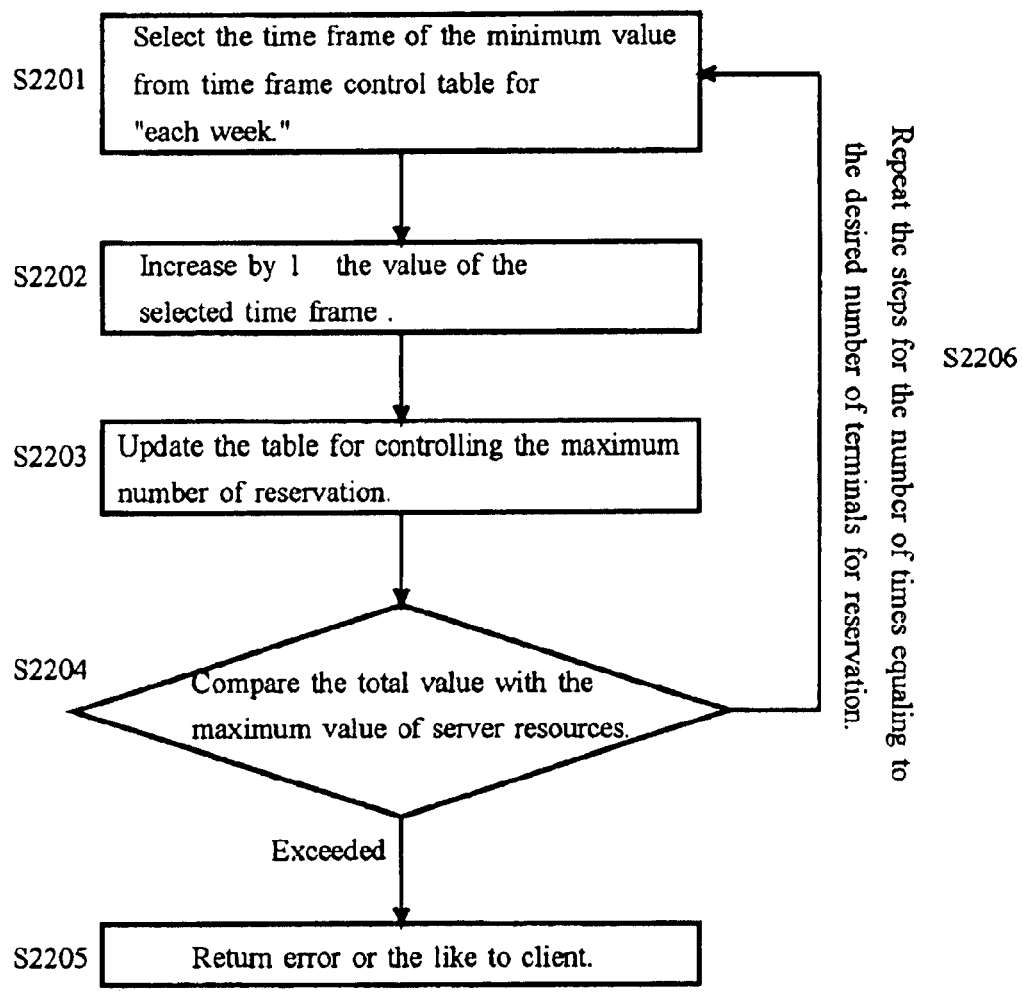
FIG. 22 is a process flowchart, in which "each week" is specified as the "cycle" in the content of a request.

FIG. 22 shows the flowchart for the time frame reservation means 1607 when "each week" is specified for the "cycle" of the request.

In step S2201, the time frame of the minimum value is selected out of the time frames, in which the respective value in the table of flags of the effective range is "1," from the time frame control table 1611 for "every week," which is accumulated in the data accumulation means 1610. When a plurality of time frames are in the table, any one time frame is selected at random.

In step S2203, the table 1612 for controlling the maximum number of reservation for "each week," which is accumulated in the data accumulation means 1610, is updated.

In step S2202, the value of the time frame selected in step S2201 is increased by 1.

Furthermore, in step S2203, the total value of each time slot corresponding to the time frame selected in S2201 is found with regard to all the tables for controlling the maximum number of reservation accumulated in the data accumulation means 1610. If the total value does not exceed the maximum value of the time slot of the server resource control table 1613 accumulated in the data accumulation means 1610 (in the case of branching to a the direction where "exceeded" is not written in step S2204 in FIG. 22), it is determined that an additional reservation of new resources can be made for the day and time, and process the operation of additional reservation is performed. If the total value exceeds the maximum value of the time slot of the server resource control table 1613 (in case of branching to the direction where "exceeded" is written in step S2204 in FIG. 22), a response such as an error, which means the client 1601 cannot issue a request, is returned in step S2205.

As step S2206, the steps from S2201 to S2204 are repeated for the number of times equaling to the "desired number of terminals for reservation" of the request. When the reservation is performed for the number of times equaling to all the "desired number of terminals for reservation." the time frame control table 1611, and the table 1612 for controlling the maximum number of reservation after reservation are outputted.

Figure 23:
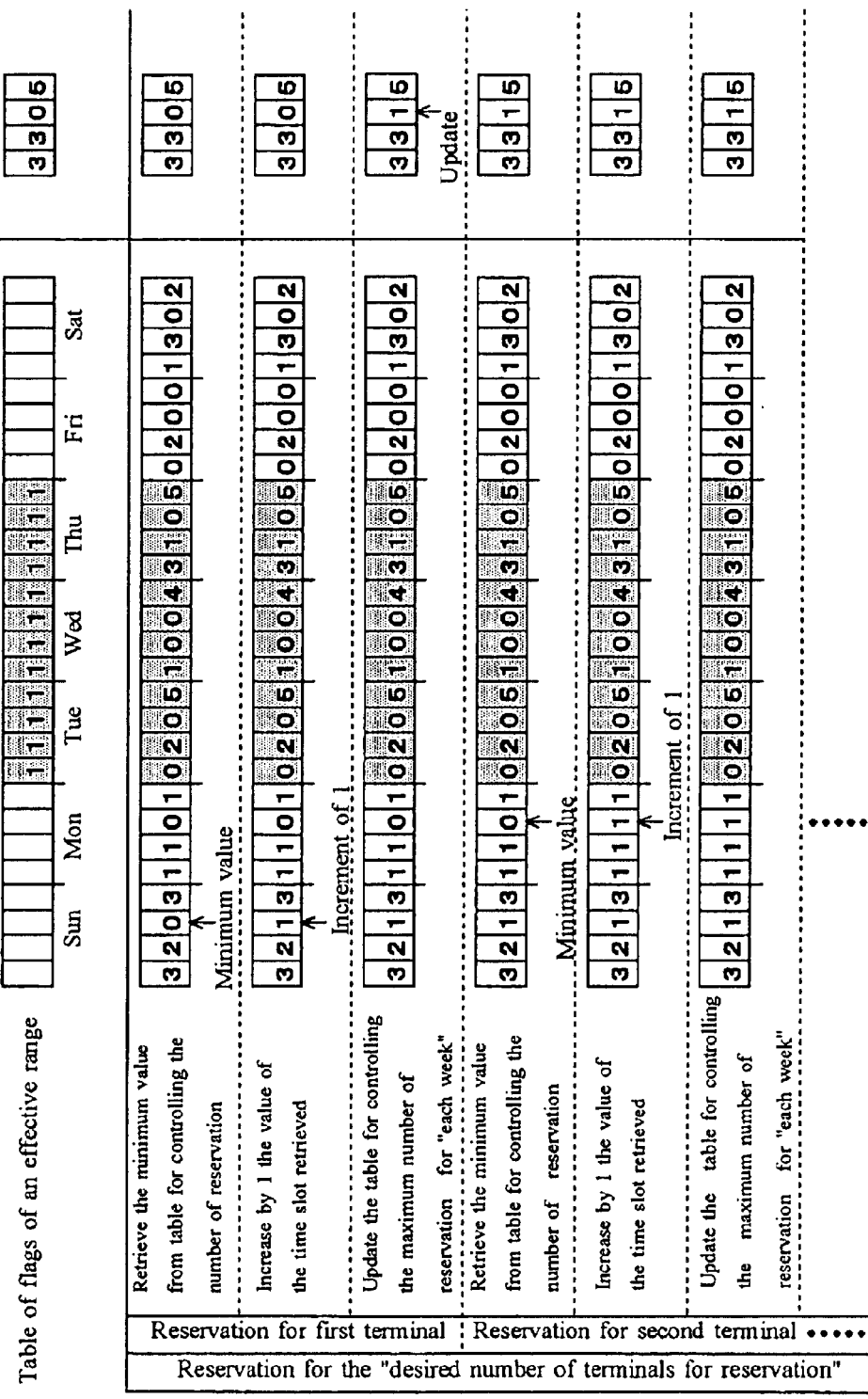
FIG. 23 illustrates the reservation operation by the time frame reservation means.

FIG. 23 shows an example of reservation in the time frame reservation means 1607. Firstly, for reservation of the first terminal, the minimum value is retrieved from the reservation control table, and the value of the time slot retrieved is increased by 1. Then, the table for controlling the maximum number of reservation for "each week" is updated if necessary.

As described above, by using the table for controlling the maximum number of reservation, only the area of time slots, in which the minimum value is stored, in the table for controlling the maximum number of reservation may be scanned without scanning all the entries of the time frame control table, and thus the time slot to be allocated can be found efficiently.

As described above, according to the present invention, firstly, the load to the server can be minimized, or in other words, the apparatus is prevented from being overloaded by an unbalanced load of time slots on a particular day. Further, since the maximum value of the number of processes is found, and since it is not the sum of the number of processes processed in each time slot, the present invention produces a table as in FIG. 2, which is a table that stores the respective number of processes executed by each time slot for the first day, the second day and the 365th day with 365 days as a cycle for example. Moreover, even if N is not a number by which 365 days is divisible. e.g., 100, the present invention can prevent a case, in which the number inserted in the table of maximum values respectively for the number of processes for each time slot is not a natural number. More specifically, the present invention can prevent a case, wherein the sum of the respective number of processes of each time slot in relation to four days. i.e., the first day, the 101st day, the 201st day and the 301st day, is inserted into the row of the first day: the sum of the respective number of processes of each time slot of three days. i.e., the 100th day, 200th day, and the 300th day, is inserted into the row of the 100 day; and an obviously smaller value than that of the first day is inserted into the row of the 100th day.

Furthermore, when the table shown in FIG. 2 is the table that stores the respective number of processes executed by each time slot for the first day, the second day, . . . , and the 365th day with 365 days as a cycle, the table itself exemplified in FIG. 2 can be regarded as the table of maximum values respectively for the number of processes for each time slot in the cycle of 365 days and a time slot, in which the maximum value of the number of processes in the cycle of 365 days becomes minimum, can be found, thereby creating a schedule in the cycle of 365 days in addition to creating a schedule in the cycle of N days.

Secondly, since the processes are associated with the time slot, in which the load to the server is at minimum, and accordingly executed, the processes are executed in such a manner that the load to the server is minimized.

Thirdly, the task of finding the table of maximum values respectively for the number of processes for each time slot is reduced, and the operation to create a schedule can be efficiently performed.

Fourthly, since only the respective time slot, in which the minimum value is stored, in the table for controlling the maximum number of reservation, is allocated in order to allocate the time slot for processes, there is no need to scan all the entries in the time frame control table and thus the time slots can be allocated efficiently.

Although the preferred embodiments of the present invention have been described in detail, it should be understood that various changes, substitutions and alternations can be made therein without departing from the spirit and the scope of the inventions as defined by the appended claims.

What is claimed is:

1. A method for smooth scheduling on a periodic basis in a client-server system, which creates a schedule to find a time slot in which a number of processes performed in a same time slot is minimized under a rule that the processes are performed in the same time slot every time a specified period passes, wherein said processes performed in the same time slot every time a specified period passes are performed based on a table of time slots for processes, wherein a time slot, in which the processes are performed, and a process identifier, which is an identifier to identify the process to be performed in the time slot, are associated with each other and held therein, said method comprising the steps of:

calculating a table of maximum values respectively for the number of processes for each time slot to find the table of maximum values respectively for the number of processes for each time slot, wherein the respective maximum value of the number of processes, which is a maximum value in each time slot of the number of processes performed in a cycle of a specified period, is associated with the time slot stored therein;

calculating a time slot, which finds a time slot, in which a minimum value among said maximum values is associated and stored therein, wherein said maximum values are stored in the table of maximum values respectively for the number of processes for each time slot, found in said step of calculating the table of maximum values respectively for the number of processes for each time slot;

accepting a process identifier; and associating a process identifier, accepted by the step of accepting a process identifier, with the time slot found in the step of calculating a time slot, and which stores the same in said table of time slots for processes.

2. The method for smooth scheduling on a periodic basis in a client-server system according to claim 1, wherein the process identifier is associated one by one in the table of time slots for processes in the step of associating a process identifier, said method further comprising the step of:

updating a maximum value of the number of processes, which increases by one the maximum value of the number of processes associated with said time slot stored in the table of maximum values respectively for the number of processes for each time slot if the number of processes, identified by the process identifiers associated with, and stored in the time slot found in said step of calculating a time slot is equal to the maximum value of the number of processes, which is associated with, and stored in the corresponding time slot of said table of maximum values respectively for the number of processes for each time slot.

3. An apparatus in a client-server system, having a scheduler embodied on a computer readable medium for creating a schedule to find a time slot in which a number of processes performed in a same time slot is minimized under a rule that the processes are performed in the same time slot every time a specified period passes, wherein said processes performed in the same time slot every time a specified period passes are performed based on a table of time slots for processes, wherein a time slot, in which the processes are performed, and a process identifier, which is an identifier to identify the respective process to be performed in the time slot, are associated with each other and held therein, said apparatus comprising:

a means for calculating a table of maximum values respectively for the number of processes for each time slat to find the table of maximum values respectively for the number of processes for each time slot, wherein a respective maximum value of the number of processes, which is a maximum value in each time slot of the number of processes performed in a cycle of a specified period, is associated with the time slot stored therein;

a means for calculating a time slot, which finds a time slot, in which a minimum value among said maximum values is associated and stored therein, wherein said maximum values are stored in the table of maximum values respectively for the number of processes for each time slot, found in said means for calculating a table of maximum values respectively for the number of processes for each time slot;

a means for accepting a process identifier; and a means for associating a process identifier, accepted by the means for accepting a process identifier, with the time slot found in the means for calculating a time slot, and which stores the same in said table of time slots for processes.

4. The apparatus in a client-server system, having a scheduler embodied on a computer readable medium according to claim 3, wherein the process identifier is associated one by one in the table of time slots for processes in the means for associating a process identifier, said apparatus further comprising:

a means for updating the maximum value of the number of processes, which increases by one the maximum value of the number of processes, associated with said time slot stored in the table of maximum values respectively for the number of processes for each time slot if the number of processes, identified by the process identifiers associated with, and stored in the time slot found in said means for calculating a time slot, is equal to the maximum value of the number of processes, which is associated with, and stored in the corresponding time slot of said table of maximum values respectively for the number of processes for each time slot.

5. The apparatus in a client-server system, having a scheduler embodied on a computer readable medium according to claim 4, wherein said process, performed in the same time slot every time a specified period passes, is a process in which a server makes a call out to information equipment to transmit control instruction.

6. The apparatus in a client-server system, having a scheduler embodied on a computer readable medium according to claim 3, wherein said process, performed in the same time slot every time a specified period passes, is a process in which a server makes a call out to information equipment to transmit control instruction.

7. A scheduler embodied on a computer readable medium for creating a schedule to find a time slot in which a number of processes performed in a same time slot is minimized under a rule that the processes are performed in the same time slot every time a specified period passes, wherein said processes performed in the same time slot every time a specified period passes are performed based on a table of time slots for processes, wherein a time slot, in which the processes are performed, and a process identifier, which is an identifier to identify the process to be performed in the time slot, are associated with each other and held therein, said scheduler causing a computer to execute the steps of:

calculating a table of maximum values respectively for the number of processes for each time slot to find the table of maximum values respectively for the number of processes for each time slot, wherein a respective maximum value of the number of processes, which is a maximum value in each time slot of the number of processes performed in a cycle of a specified period, is associated with the time slot stored therein;

calculating a time slot, which finds a time slot, in which a minimum value among said maximum values is associated and stored therein, wherein said maximum values are stored in the table of maximum values respectively for the number of processes for each time slot, found in said step of calculating the table of maximum values respectively for the number of processes for each time slot;

accepting a process identifier; and associating a process identifier, accepted by the step of accepting a process identifier, with the time slot found in the step of calculating a time slot, and which stores the same in said table of time slots for processes.

* * * * *